United States Patent [19]
Hitchcock

[11] 3,986,021
[45] Oct. 12, 1976

[54] PASSIVE SOLAR TRACKING SYSTEM FOR STEERABLE FRESNEL ELEMENTS

[75] Inventor: Robert D. Hitchcock, Ventura, Calif.

[73] Assignee: The United States of America as represented by the Secretary of the Navy, Washington, D.C.

[22] Filed: Oct. 24, 1975

[21] Appl. No.: 625,394

[52] U.S. Cl. .............................. 250/203 R; 126/270
[51] Int. Cl.² ............................................. G01J 1/20
[58] Field of Search ............. 250/201, 203 R, 215, 250/216; 136/89; 126/270, 271

[56] References Cited
UNITED STATES PATENTS

| | | |
|---|---|---|
| 3,515,594 | 6/1970 | Samuels .......................... 250/203 R |
| 3,613,659 | 10/1971 | Phillips .............................. 126/270 |
| 3,917,942 | 11/1975 | McCay ............................ 250/203 R |

*Primary Examiner*—David C. Nelms
*Attorney, Agent, or Firm*—Richard S. Sciascia; Joseph M. St.Amand

[57] ABSTRACT

An angular tracking servo system for passive tracking of the sun which utilizes solar radiation to control the attitude of a mirror element in an array of Fresnel reflectors. The array collects and focuses solar energy onto a high efficiency conversion device. The energy required to move the mirror element is supplied by a gear system which is attached through a pivot arm to a vertically moving float immersed in a chamber containing water.

10 Claims, 10 Drawing Figures

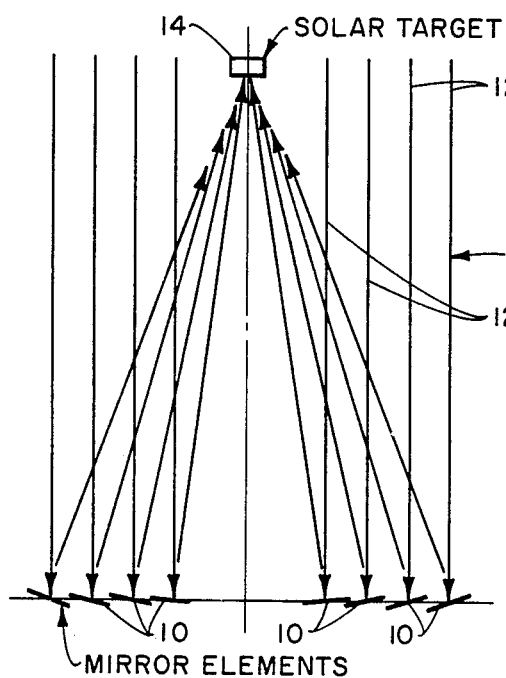
Fig. 1. FRESNEL-MIRROR SOLAR COLLECTOR
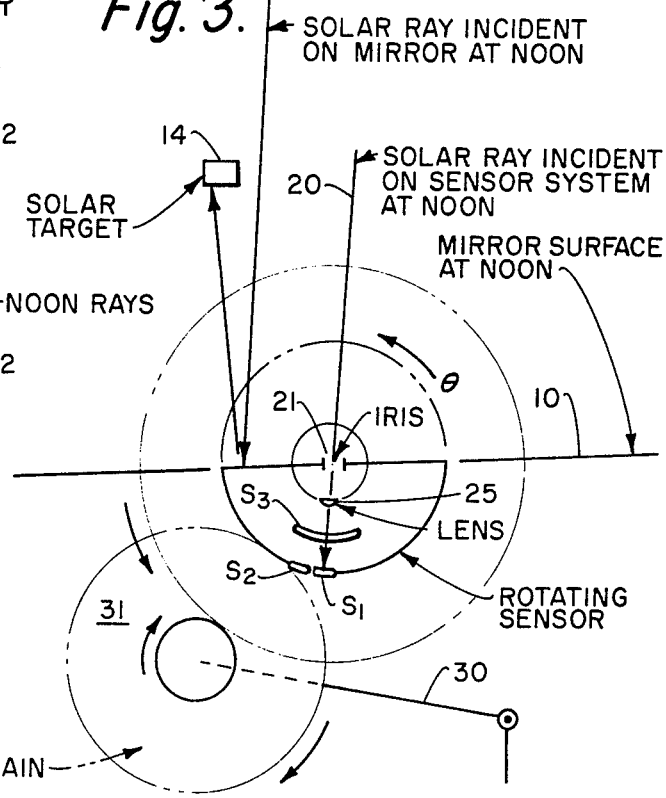
Fig. 3.
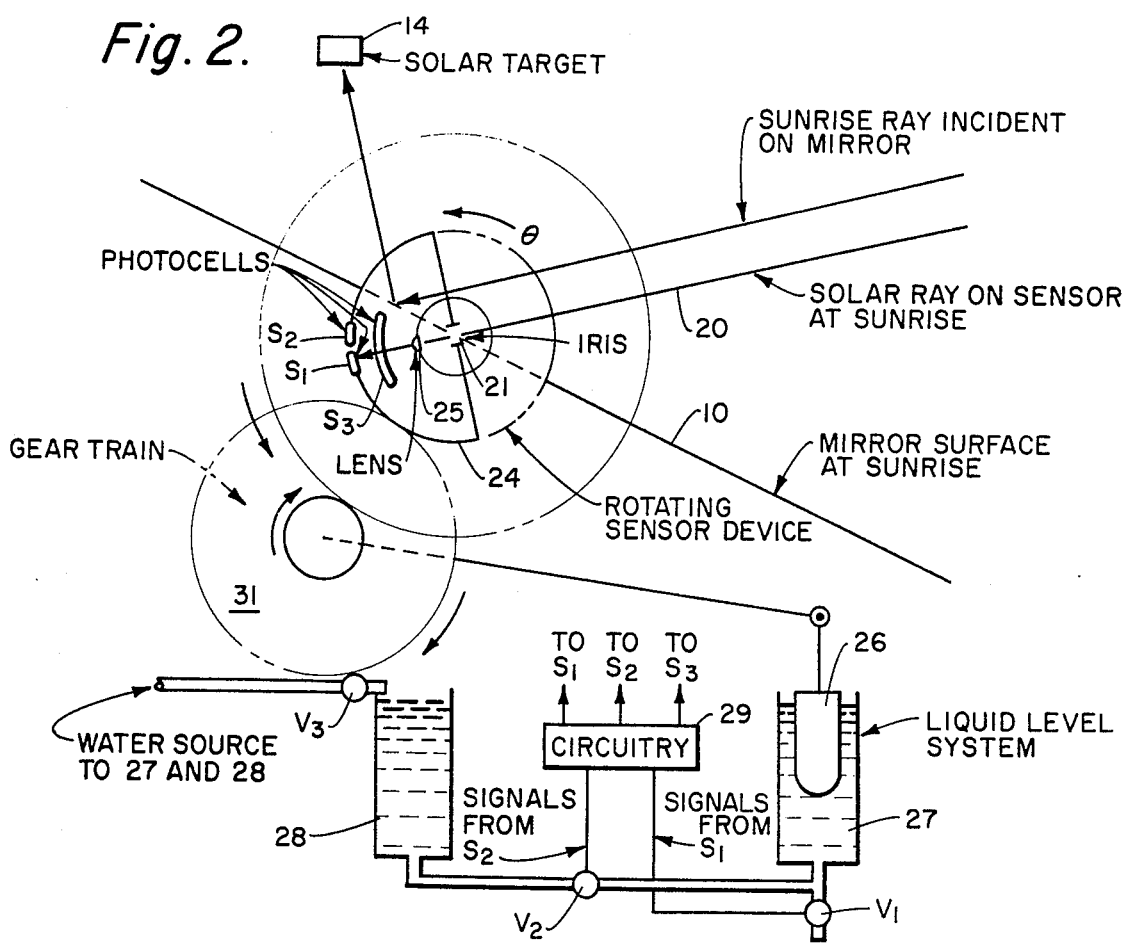
Fig. 2.

Fig. 4a. 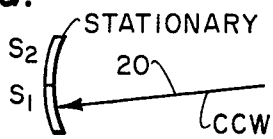 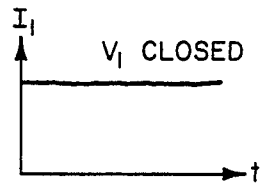 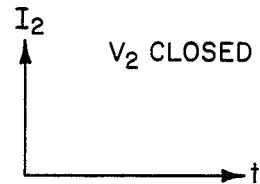
Fig. 4b. 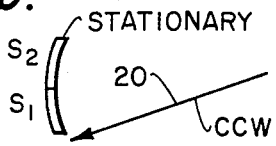 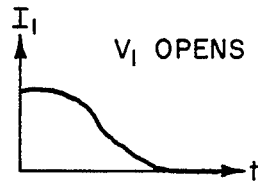 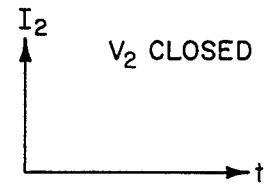
Fig. 4c. 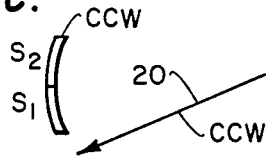 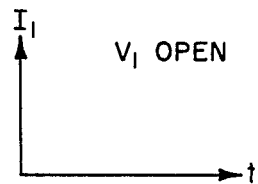 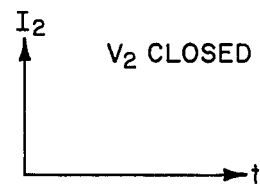
Fig. 4d. 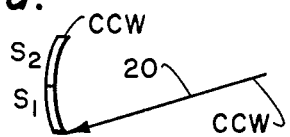 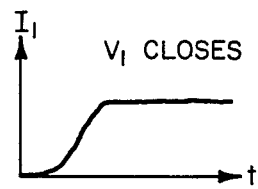 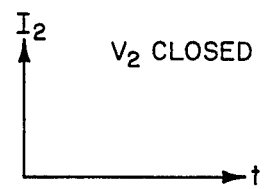
Fig. 4e. 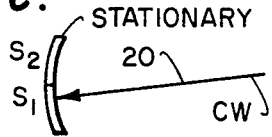 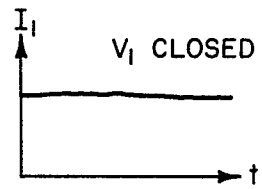 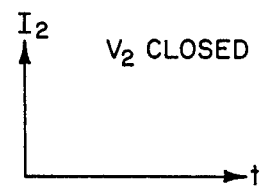
Fig. 4f. 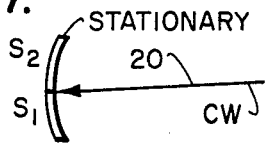 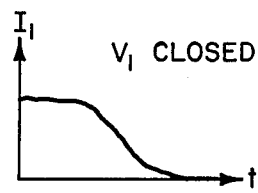 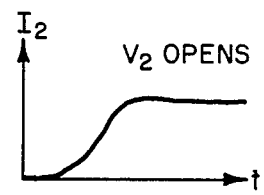
Fig. 4g. 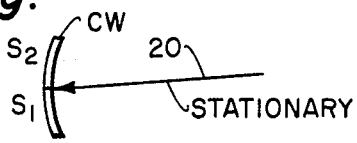 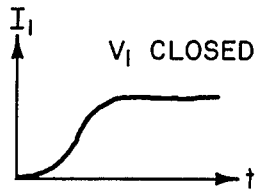 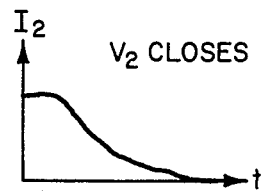

PASSIVE SOLAR TRACKING SYSTEM FOR STEERABLE FRESNEL ELEMENTS

BACKGROUND OF THE INVENTION

The present invention relates to servo systems and particularly to a passive tracking servo system for mirror elements in a steerable Fresnel solar energy collector.

Large-scale solar radiation collectors, based on the principle of the steerable Fresnel mirror, have been previously proposed. Such collectors comprise a large array of mirrors, each of about one square meter, arranged in concentric circles on a flat ground. Solar radiation is focused, as shown in FIG. 1, onto a solar target device, such as a steam boiler, for example, for converting thermal energy to electrical energy through a conventional thermodynamic cycle. However, a major problem is in controlling the attitude of each mirror element such that the sun is continuously tracked and focused with maximum precision onto the conversion device (i.e., solar target).

Due to restrictions on fossil fuel power plants, there is a need for solar energy power generating facilities. At various land facilities which have large areas of flat ground, it is possible to install the type of solar collector/focuser needed for generating relatively large amounts of power. Rain water can be used to supply the hydrostatic head for providing rotational energy for each Fresnel reflector. Where rain water is used, a sufficiently large area is needed for collection of rain water in sufficient quantity to renew, daily, the hydrostatic head requirements.

SUMMARY OF THE INVENTION

The present invention is for an angular tracking servo system which utilizes solar radiation to control the attitude of a mirror element in an array of Fresnel reflectors. The array is for collecting and focusing solar energy onto a high-efficiency conversion device. The control signals for the servo system are generated by photovoltaic sensors. The energy required to move the Fresnel mirror elements is supplied by a hydrostatic head maintained by a year-round rain water collector. A gear system attached through a pivot arm to a float in a chamber containing the water operates to move the mirror elements. Two valves respectively control inflow and outflow to the chamber. The valves are controlled by conventional circuitry which generates GO or NO-GO signals for opening or closing the respective valves in response to current output from three photovoltaic sensors. The present system provides mechanical motion by changes in a fluid head, specifically a volume of water, the static head of which is controlled by magnetically actuated valves powered directly by the current from photovoltaic sensor.

BRIEF DESCRIPTION OF THE DRAWINGS

FIG. 1 is a diagrammatic illustration of Fresnel mirror elements used to focus solar radiation onto a solar target (i.e., energy conversion device).

FIG. 2 is a schematic diagram for a preferred embodiment of the servo system of this invention for passive tracking of the sun, showing position of a mirror element at sunrise.

FIG. 3 is a diagram, as in FIG. 2, but showing the mirror element at noontime.

FIGS. 4a-4g shows how the photovoltaic sensors are made to follow the sun.

DETAILED DESCRIPTION OF THE PREFERRED EMBODIMENT

As shown in FIG. 1, Fresnel mirror elements 10 are used to focus solar rays 12 onto a solar target 14, which is an energy conversion device such as a steam boiler, etc., for converting thermal energy to electrical energy through a conventional thermodynamic cycle. An angular tracking servo system is used to control the attitude of each mirror element 10 in the array of Fresnel reflectors.

FIGS. 2 and 3 are schematic diagrams of the servo system for passive tracking of the sun. The attitude of each Fresnel mirror element 10 is controlled by an individual servo mechanism which minimizes the angular error, $\Delta\theta$. This angular error is the difference between the angle of the incident solar ray 20 passing through a rotating iris 21 and the rotational angle of a photovoltaic sensor, $S_1$. As the sun's rays rotate from sunrise to sunset, the servo system of this invention causes rotating sensor device 24, on which the iris 21 and sensors $S_1$, $S_2$ and $S_3$ are mounted to follow, such that the thin pencil of sunlight passing through the iris is focused onto the semicylindrical surface within $\Delta\theta$ of sensor $S_1$. A rotating sensor device 24 is attached to each mirror element 10 in the set of Fresnel reflectors of FIG. 1.

The rotating sensor device 24 is a semi-cylindrical unit which houses photovoltaic sensors $S_1$ and $S_2$ on the cylindrical wall thereof. Sensor $S_3$ is a wide-angle, semi-transparent film mounted between lens 25 and sensors $S_1$ and $S_2$. Iris 21 is located at the center of rotation.

Rotation energy is supplied by a vertically moving float 26 in chamber 27 of the liquid level system, which contains water. The water is preferably supplied by rain which maintains a supply of water for reservoir 28.

Outflow of water from chamber 27 is controlled by valve $V_1$; inflow is controlled by valve $V_2$ which introduces water from reservoir 28. Each night, chamber 27 and reservoir 28 are filled by a refill valve $V_3$ or by any suitable means from a water supply (i.e., rain, etc.) from an elevated source to the liquid level system 27 and 28 of each servo system of the Fresnel mirrors array. Ideally, the water supply is maintained at capacity by a year-round rain water collector. Hence, the only external energy required is that needed for actuating the refill valve $V_3$ each night.

Float 26 is coupled through float arm 30 and gear train 31 to the rotating sensor device 24 and the rotating Fresnel reflector 10. The gear ratios are such that the sun's energy is continuously focused onto the target 14 while, at the same time, $\Delta\theta$ is minimized. Furthermore, the gear ratios allow for rotation from sunrise to sunset for an overall vertical float movement of only a few inches. Suitable bearings, lubrication and balancing are such that the required rotational energy is small.

Control of the valves $V_1$ and $V_2$ in the liquid-level system is done by conventional solid state circuitry 29. Valves $V_1$ and $V_2$ are actuated magnetically via circuitry 29 by electrical current generated by sensors $S_1$ and $S_2$, which convert impingent solar energy directly to electrical energy. Servo action is provided by sensors $S_1$ and $S_2$ and by referring to FIGS. 4a through 4g operates as follows:

With valves $V_1$ and $V_2$ initially closed, as shown in FIG. 4a, $S_1$ and $S_2$ are stationary, and the rising sun causes ray 20 of FIG. 2 to move in a counterclockwise (CCW) direction. The electrical current $I_2$ from sensor $S_2$ is initially zero as shown in FIG. 4a and the current $I_1$ from sensor $S_1$ is initially at a maximum, also as shown in FIG. 4a.

In FIG. 4b, the CCW moving ray 20 leaves the surface of sensor $S_1$ and the result is that current $I_1$ from sensor $S_1$ goes from maximum to zero as is shown in the curve for $V_1$ shown in FIG. 4b. By circuitry 29 of FIG. 2 the negative time derivative (i.e., $dI_1/dt < O$) in the current versus-time plot of the output of $S_1$ causes valve $V_1$ to open.

With valve $V_1$ open, float 26 of FIG. 2 descends and by means of gear train 31 and float arm 30 the sensors $S_1$ and $S_2$ move CCW as shown in FIG. 4c.

Sensors $S_1$ and $S_2$ then catch up with ray 20 and the result is a positive derivative in the output $I_1$ of $S_1$ (i.e., $dI_1/dt > O$), as shown in FIG. 4d. Circuitry 29 is designed such that valve $V_1$ closes. Hence, sensors $S_1$ and $S_2$ again become stationary. The sun ray 20 continues moving CCW only if there is no temporarily irregular refraction of the sun's ray as caused by cloud passage for example, or if there is no change in the relative orientation of the axis of the iris-lens system 21 and 25 of FIG. 2 as may be caused by transient motion of the structure supporting the mirror system (caused by wind, temperature, or earth tremors and the like). The ray 20, hence, in the absence of such irregular motions, will continue moving CCW as the day progresses. The ray 20 will then again leave sensor $S_1$ and another negative time derivative in $I_1$ will occur as in FIG. 4b and $V_1$ will open causing further CCW motion of sensors $S_1$ and $S_2$. Therefore, with ray 20 always moving CCW, the sensors $S_1$ and $S_2$ will follow the ray 20 in stepwise fashion.

Now, if ray 20 should, as in FIG. 4e, move clockwise (CW) instead of counterclockwise (CCW) relative to sensors $S_1$ and $S_2$ for reasons cited above, then ray 20 would leave the surface of $S_1$ at the opposite edge of $S_1$ and cause a negative time derivative in the current $I_1$ and, at the same time, a positive time derivative in the current $I_2$ from sensor $S_2$ as shown in FIG. 4f. This particular combination of time derivatives from sensors $S_1$ and $S_2$ simultaneously will cause circuitry 29 to open valve $V_2$ while valve $V_1$ remains closed. Hence, water from reservoir 28 of FIG. 2 enters chamber 27 raising float 26 and causing CW rotation of sensor device 24 and sensors $S_1$ and $S_2$.

When the transient disturbance is ended, ray 20 stops momentarily, as shown in FIG. 4g, and the CW motion of sensors $S_1$ and $S_2$ results in ray 20 to go back onto $S_1$, the result being a positive derivative in $I_1$ and a negative derivative in $I_2$. This combination of derivatives causes circuitry 29 to close valve $V_2$ and keep valve $V_1$ closed. Now, $S_1$ and $S_2$ are stationary again; ray 20 is again moving CCW; and the situation is back to that shown in FIG. 4a. This operation causes the mirror 10 to rotate with rotating sensor device 24. FIG. 3, for example, shows the position of the system at mid-day.

The sensor $S_3$ of FIGS. 2 and 3 is a wide-angle, semi-transparent photovoltaic film in the path of solar ray 20 which is mounted in rotating sensor device 24 along with $S_1$ and $S_2$, and hence moves with $S_1$ and $S_2$. Sensor $S_3$ causes the system to respond only to time derivatives (in the output of $S_1$ and $S_2$) which result from the movement of ray 20 relative to the sensors $S_1$ and $S_2$. Thus, if an atmospheric object such as a cloud should suddenly cause the intensity of ray 20 to decrease, sensor $S_3$ will sense this change and bias circuitry 29 such that the input to circuitry 29 is unchanged.

Sensors $S_1$ and $S_2$ are adjacent to each other and move together. There is no gap between them other than about 0.001 inch needed to separate them electrically. When the sun ray leaves sensor $S_1$ going toward sensor $S_2$, it touches $S_2$ immediately.

Sensors $S_1$, $S_2$ and $S_3$ provide input signals to circuitry 29 which provides GO or NO-GO output signals for any combination of time derivative input signals to cause the valves $V_1$ and $V_2$ to open or close. For example, GO signals can be provided by capacitors charged by current from the photo sensors. A GO signal is a maximum-current signal. A NO-GO signal is a zero-current signal (i.e., there are no signals having an intermediate value of current).

When valve $V_3$ is actuated each night after sunset (manually or by clock operated mechanism), valve $V_2$ is also opened so that float 26 can cause the mirror to be repositioned to the sunrise position.

With the maximum hydrostatic pressure of a few inches on valves $V_1$ and $V_2$, only a very small current is needed to actuate these valves. About one hour after sunrise, on a clear day, a 1-square centimeter area, perpendicular to the sun's rays, receives approximately 10 milliwatts. Hence, a gallium-arsenide photovoltaic sensor having 0.3 amp-cm$^2$/watt short-circuit sensitivity will generate 3 milliamps, which is more than enough to actuate a magnetic valve under a few inches of pressure. Iris 21 can be as small as 1 millimeter square, and the resulting 0.03 milliamps is still sufficient to actuate valves $V_1$ and $V_2$. An iris of 1 mm$^2$ will permit a $\Delta\theta$ within 0.01 degree.

This passive tracking system requires no external power to rotate the mirrors. By using rain to supply the water, the liquid level system can be substantially maintenance free. The use of rain water and the liquid-level system permit a year-round rotational energy source. The system described herein provides high angular tracking accuracy and, hence, maximum utilization of solar energy. The photovoltaic sensors and circuitry provide fast response.

Obviously, many modifications and variations of the present invention are possible in the light of the above teachings. It is therefore to be understood that within the scope of the appended claims the invention may be practiced otherwise than as specifically described.

What is claimed is:

1. An angular tracking servo system for passive tracking of the sun, utilizing solar radiation for controlling the attitude of a mirror element in an array of Fresnel reflectors, comprising:
    a. a reflector element mounted on an axis for rotational movement to reflect solar rays impingent upon the reflector surface to a solar energy conversion device;
    b. a rotating sensor device mounted on said reflector element axis for rotation therewith; said sensor device including photovoltaic sensor means for generating current outputs in response to solar radiation impingent thereon;
    c. a liquid level means containing a float means which operates to move vertically as the level of liquid in the liquid-level means changes;
    d. drive means connected between said rotatable reflector axis and said float means operable to rotate said reflector in response to vertical movement of said float means;

e. means for raising and lowering the level of the liquid in said liquid-level means in response to current output signals from said photovoltaic sensor means, whereby said reflector element and rotating sensor device is continuously rotated to a new position tracking the sun from sunrise to sunset with high angular accuracy and focusing the solar rays impingent on said reflector element onto the solar energy conversion device.

2. A system as in claim 1 wherein said drive means comprises a float pivot-arm and a gear train.

3. A system as in claim 1 wherein said means for raising and lowering the level of liquid in said liquid-level means comprises a water supply and valve means whereby one derivative signal from said photovoltaic sensor means operates said valve means to lower the liquid-level and second derivative signal from said photovoltaic sensor means operates to raise the level of liquid in said liquid-level means, thus lowering and raising said float means in response to said signals and in turn causing rotational movement of said reflector element to follow the sun.

4. A system as in claim 3 wherein said valve means comprises a first and a second magnetically operated valve, said first valve when actuated to open being operable to allow water to flow into said liquid-level means and said second valve when actuated to open being operable to allow water to flow out of said liquid-level means.

5. A system as in claim 4 wherein circuit means, controlled by the current signals from said photovoltaic sensor means, provides the energy to actuate said magnetically operated valves.

6. A system as in claim 1 wherein said rotating sensor means comprises:
a. a semi-cylindrical housing for enclosing said photovoltaic sensor means;
b. an iris located at the center of rotation of said rotating sensor means which is the axis of rotation of the reflector element;
c. said photovoltaic sensor means being mounted on the cylindrical wall of said housing such that solar rays passing through said iris may impinge upon the photovoltaic sensor means for generating electrical current signals to track said solar rays as they move.

7. A system as in claim 6 wherein means is provided to focus solar rays passing through said iris onto said photovoltaic sensor means.

8. A system as in claim 6 wherein the photovoltaic sensor means in said rotating sensor device comprises a pair of adjacent photo cells such that as the impinging moving solar rays pass from one of said pair of adjacent photo cells to the other or pass off the surface of the photovoltaic sensor the resulting derivative current outputs will indicate the direction of movement of the solar rays whereby said rotating sensor device and reflector element are made to accurately track said solar rays.

9. A system as in claim 8 wherein a wide-angle semi-transparent third sensor is interposed between said iris and said adjacent pair of photo cells for causing the photovoltaic sensor means to respond to intensity variations in the solar rays and bias the output of said photo cells.

10. A system as in claim 3 wherein said water supply is naturally replenished by rain water.

* * * * *